(12) United States Patent
Yan

(10) Patent No.: US 7,023,186 B2
(45) Date of Patent: Apr. 4, 2006

(54) TWO STAGE BOOST CONVERTER TOPOLOGY

(75) Inventor: Cheng Chung Yan, Shatin (HK)

(73) Assignee: Astec International Limited, Hong Kong (HK)

( * ) Notice: Subject to any disclaimer, the term of this patent is extended or adjusted under 35 U.S.C. 154(b) by 0 days.

(21) Appl. No.: 10/913,599

(22) Filed: Aug. 5, 2004

(65) Prior Publication Data

US 2006/0028186 A1 Feb. 9, 2006

(51) Int. Cl.
*G05F 1/10* (2006.01)
(52) U.S. Cl. .................. 323/225; 323/224; 323/259
(58) Field of Classification Search ........... 323/222, 323/224, 225, 232, 259, 271, 284, 285, 344, 323/351
See application file for complete search history.

(56) References Cited

U.S. PATENT DOCUMENTS

| | | | |
|---|---|---|---|
| 4,816,739 A | 3/1989 | Sakurai et al. | 323/272 |
| 5,119,013 A | 6/1992 | Sabroff | 323/267 |
| 5,122,728 A | 6/1992 | Ashley | 323/282 |
| 5,247,239 A * | 9/1993 | Yamamura et al. | 323/222 |
| 5,321,348 A | 6/1994 | Vinciarelli et al. | 323/222 |
| 5,929,614 A | 7/1999 | Copple | 323/222 |

FOREIGN PATENT DOCUMENTS

EP    1 027 638 B1    8/2002

OTHER PUBLICATIONS

J. Chen, et al., "Analysis and Design of SEPIC Converter in Boundary Conduction Mode for Universal-Line Power Factor Correction Applications," IEEE Power Electronics Specialists Conference, Jun. 2001.
L. Peterson , et al., "Reduction of Voltage Stresses in Buck-Boost-Type Power Factor Correctors Operating in Boundary Conduction Mode," IEEE Applied Power Electronics Conference, Feb. 2003.

* cited by examiner

*Primary Examiner*—Jessica Han
(74) *Attorney, Agent, or Firm*—Nixon Peabody LLP

(57) ABSTRACT

A power converter having a two stage boost circuit and a small boost converter. The main power flow for the power converter is via the two stage booster circuit having a single switch. The voltage spike of the switch is clamped by a diode and a capacitor. The energy at the capacitor is transferred to the power converter's output terminals by the small boost converter. The two stage boost converter topology enables the use of much lower voltage and Rdson MOSFET switches so as to reduce cost, switch conduction loss and turn on loss.

15 Claims, 5 Drawing Sheets

TWO STAGE BOOST CONVERTER TOPOLOGY

FIELD OF INVENTION

The present invention relates in general to DC-DC converters, and more particularly, to a boost converter circuit topology for high power applications that utilizes a second smaller boost converter for reducing conduction loss and enabling the use of a substantially lower voltage rated MOSFET main boost switch.

BACKGROUND OF INVENTION

A boost converter is a power converter where a smaller input DC voltage is increased to a desired level. A prior art typical boost converter 10 is shown in FIG. 1. Boost converter 10 has input terminal 2, 4 for enabling an input voltage Vin to be coupled to converter 10, and output terminals 6, 8 where the output DC voltage is provided. The boost converter 10 includes an inductor 18, to which the input voltage Vin is coupled, that is in series with a boost diode 16 connected to an output capacitor 12 across which the load (not shown) is connected at terminals 6,8. A transistor switch 14 is connected to a node 15 between the inductor 18 and boost diode 16 and a ground return line 20 to provide regulation of the output voltage. The switch 14 is typically a MOSFET having a control input, a drain and a source terminal. A control circuit 42 (details not shown) is coupled to the control input for providing a control signal for controlling the timing of the on and off transition of the switch 14. The control circuit 42 typically has a pulse width modulation circuit (PWM). In operation, when the switch 14 is on, the inductor current increases, storing energy in its magnetic field. When the transistor switch 14 is off, energy is transferred via the diode 16 to the output capacitor 12 and the load. Drawbacks of such conventional boost converter circuits include the creation of switch voltage and current stresses resulting in low efficiency power conversion.

In a conventional boost converter, the voltage rating required for the MOSFET 14 is determined by the voltage appearing across the MOSFET when the control circuit 42 turns it off since the inductor 18 rises up to the output voltage plus any overshoot. A conventional boost converter with an output voltage of 250 VDC requires a MOSFET having a voltage rating (drain to source) of at least 400 volts. Conventional boost converter using in high step-up ratio applications, boosting 30V dc to 250V dc for example, therefore, require a high current and high voltage rated MOSFET. A drawback of the use of high current and high voltage rated MOSFETs is increased size and cost.

The voltage drop across a MOSFET 14 between the drain and source terminal is a function of the resistance (Rdson) provided that the load current is constant. Conduction losses for a MOSFET are equal to $I^2R$ losses, therefore, the total resistance between the source and drain terminals during the on state, Rdson, should be as low as possible. Consequently, a drawback of converters requiring higher Rdson rated MOSFETS is higher conduction losses.

FIG. 2 shows a prior art boost converter 20. The boost converter 20 adds a snubber circuit 24 to the boost converter 10 of FIG. 1. The snubber circuit 24 is designed to absorb energy from the leakage inductance in the circuit and transfer this energy to the output. The snubber circuit 24 includes a capacitor 22 connected in series between inductor 18 and diode 36 and ground return line 20. Snubber circuit 24 also includes a series combination of another inductor 28 and another diode 26 connected between the junction of the capacitor 22 and the diode 36.

In operation, when the MOSFET 14 in boost converter 20 switches from ON to OFF, the voltage at node 25 is clamped by capacitor 22 and diode 36 to terminal 6 before diode 16 is turned ON. As a result, the voltage at node 25 will be slightly higher than the output voltage at terminal 6. This causes diode 16 to turn ON and clamp the voltage of node 25 to Vout. When MOSFET 14 is ON, the charge (from the leakage energy) stored at capacitor 22 will flow through inductor 28 and diode 26. At that moment, capacitor 22 and inductor 28 form a resonant network that reverses the polarity of capacitor 22. More specifically, before MOSFET 14 is turned ON, the end of capacitor 22 at node 25 is positive, but becomes negative after MOSFET 14 turns ON and the resonant action completed. Thus, before MOSFET 14 turns OFF, node 25 is negative relative to the other end of capacitor 22. As a result, the voltage spike at node 25 is clamped more effectively.

A drawback of converter 20 is that it is not suitable for high power or high boost ratio applications. More specifically, in high power applications or high boost ratio applications, the switching current at MOSFET 14 becomes high and the added capacitor 22 must be able to handle the high current demands, making it more difficult to find a suitable capacitor for a particular application. Moreover, in high boost ratio applications, a high current and high voltage rated MOSFET 14 is still required for converter 20 since the MOSFET 14 drain terminal is still clamped to the output of the boost converter. Although an improvement over converter 10 of FIG. 1, converter 20 has the similar drawback of having an unacceptably high voltage spike (>Vout) at the drain of MOSFET 14 for high current applications so as to require higher voltage rated MOSFETS with higher Rdson and corresponding higher conduction losses.

A need therefore exists for a boost converter topology for high power applications to enable the use of lower voltage and lower Rdson rated MOSFETs and to provide increased efficiency by reducing conduction losses.

SUMMARY OF THE INVENTION

The aforementioned and related drawbacks associated with prior art boost converters are substantially reduced or eliminated by the improved boost converter topology of the present invention.

The present invention overcomes the drawbacks of known boost converters by providing a power converter having a two stage boost circuit and a second smaller boost converter. The main power flow is handled by the two stage boost circuit having a single main switch. The voltage spike, Vds, of the main switch is clamped by a first diode and a first capacitor. A second boost converter transfers the energy of the first capacitor to the output terminal, $V_{out}$, and keeps the voltage constant across the first capacitor. The second boost converter is only required to handle the energy of the voltage spike at the first switch; consequently the second boost converter is much smaller than the main two stage boost circuit. The power converter of the present invention enables the use of lower voltage and lower Rdson rated MOSFETs for high power applications so as to provide increased efficiency by reducing conduction losses.

Broadly stated, the present invention provides a power converter having first and second input terminals where an input voltage is provided and two output terminals where the output DC voltage is provided comprising a two stage boost circuit comprising a first stage circuit comprising a first switch alternately switched on and off as a function of a first control signal for controlling current through a first winding of a magnetically coupled inductor, the first winding having one end connected to the first input terminal, a first diode, a first capacitor, the first switch coupled between the junction of the other end of the first winding and the first diode and the second input terminal, and a second stage circuit comprising a second winding of the magnetically coupled inductor connected to the other end of the first winding and connected in series with a second diode between the first winding and the first output terminal, and a second capacitor connected across the output terminals; and a second boost converter coupled between the first capacitor and the second capacitor comprising a second switch, an inductor, and a third diode; the second switch is connected between the junction of the inductor and the third diode and the second input terminal and is alternately switched on and off as a function of a second control signal.

Broadly stated, the present invention also provides in an alternate embodiment a power converter having first and second input terminals where an input voltage is provided and two output terminals where the output DC voltage is provided comprising: a two stage boost circuit comprising a first stage circuit comprising a first switch alternately switched on and off as a function of a first control signal for controlling current through a first winding of a magnetically coupled inductor the first winding having one end connected to the first input terminal, a first diode, and a first capacitor, and a primary winding of a current transformer connected in series between the first winding and the junction of the first switch and the first diode, the first switch coupled between the junction of the current transformer primary winding and the first diode and the second input terminal, and a second stage circuit comprising a second winding of the magnetically coupled inductor connected to the other end of the first winding and connected in series with a second diode between the first winding and the first output terminal, and a second capacitor connected across the output terminals; a second boost converter coupled between the first capacitor and the second capacitor comprising a second switch, an inductor, and a third diode; the second switch is connected between the junction of the inductor and third diode and the second input terminal and is alternately switched on and off as a function of a second control signal; and a current sensor for sensing the current through the first switch, the current sensor including a current transformer formed by the primary winding and a secondary winding, wherein the current transformer secondary winding is connected to a measurement resistor through a fourth diode.

An advantage of the present invention is that it enables the use of much lower voltage and Rdson MOSFET switches that are smaller and less costly, and reduces switch conduction and turn on losses.

Another advantage of the present invention is that it is suitable for use in high step up ratio applications.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

Reference symbols or names are used in the Figures to indicate certain components, aspects or features shown therein, with reference symbols common to more than one Figure indicating like components, aspects or features shown therein.

DETAILED DESCRIPTION OF THE INVENTION

Figure 1:
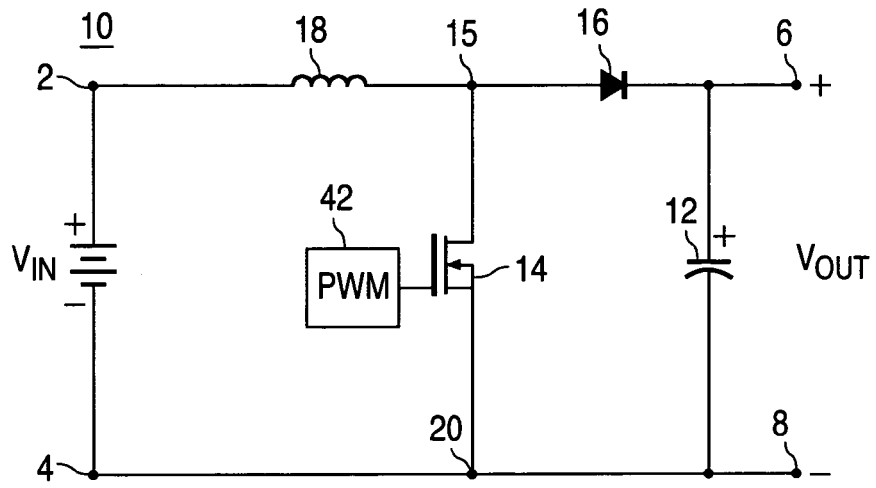
FIG. 1 is a schematic diagram of a power converter having a conventional boost topology.
Figure 2:
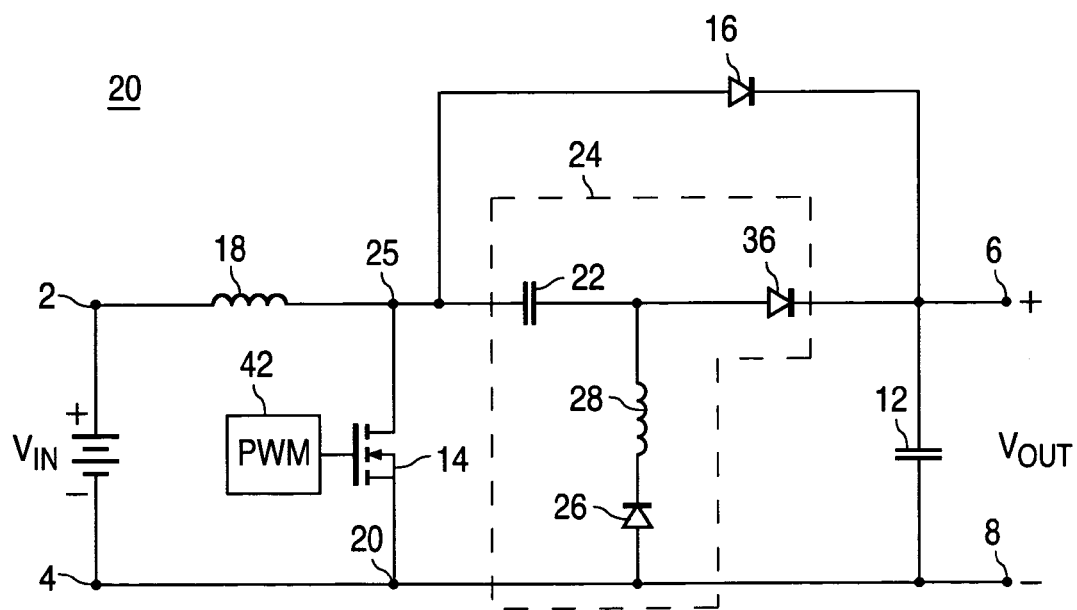
FIG. 2 is a diagram of a boost converter topology including a snubber circuit.
Figure 3:
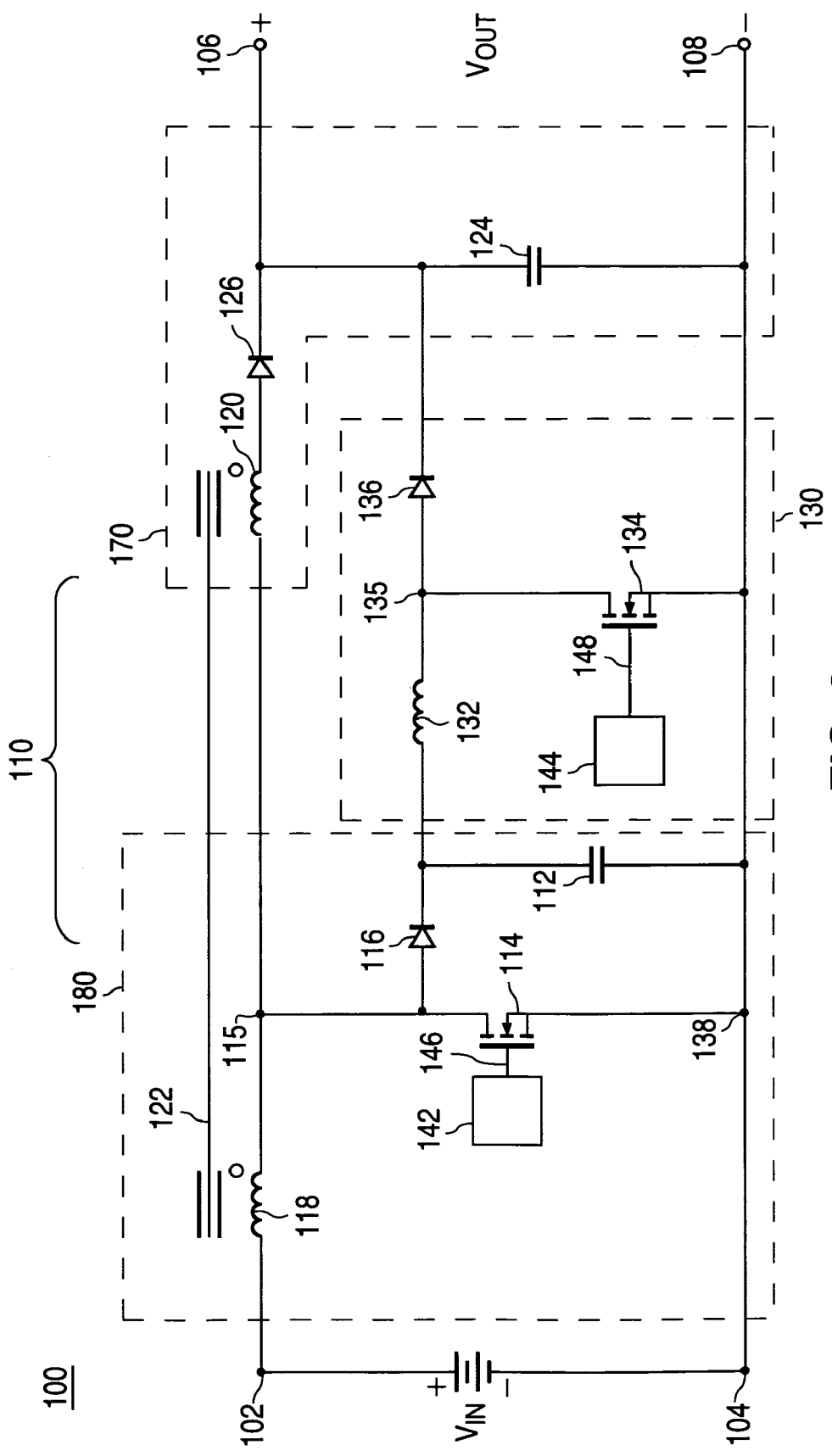
FIG. 3 is a schematic diagram of a preferred embodiment of the boost converter topology according to present invention.

FIG. 3 is a schematic diagram of a preferred embodiment of the power converter 100 according to present invention. In a preferred embodiment, the power converter 100 has a boost converter topology including first 102 and second 104 input terminals where an input voltage is coupled and two output terminals 106, 108 where the output DC voltage is provided. Power converter 100 includes a two stage boost circuit 110 and a second boost converter 130. The two stage boost circuit 10 has a first stage circuit 180 and a second stage circuit 170. The two stage boost circuit 110 includes a magnetically coupled inductor 122 having a first winding 118 having one end connected to the first input terminal 102 and a second winding 120 connected to the other end of the first winding 118.

The first winding 118 of magnetically coupled inductor 122 is part of the first stage circuit 180. The first stage circuit 180 also includes a first switch 114 having a control input. The switch 114 is typically a MOSFET having a gate, a drain, and a source terminal. A control circuit 142 (details not shown) is coupled to the control input for providing a first control signal 146 for controlling the timing of the on and off transition of the first switch 114. The control circuit 142 preferably includes a conventional PWM controller. Alternatively, the conventional PWM controller also provides power factor correction. The control circuit 142 preferably operates using conventional voltage mode control responsive to the output voltage to control the duty cycle of first switch 114. The first switch 114 is alternately switched on and off as a function of the first control signal 146 for controlling current through the first winding 118 of the magnetically coupled inductor 122. The first stage circuit 180 includes a first diode 116 having a cathode and an anode. The anode of the first diode 116 is connected to the junction of the first switch 114 and the other end of the first winding 118. As shown in the embodiment in FIG. 3, the drain terminal of first switch 114 is connected to the junction of the anode of the first diode and the first winding 118 at a node 115. The source terminal of the first switch 114 is connected to a ground return line 138 connected to the second input terminal 104. The first stage circuit 180 includes a first capacitor 112 connected between the cathode of the first diode 116 and the second input terminal 104.

The second stage circuit 170 of the power converter 100 includes the second winding 120 of the magnetically coupled inductor 122. One end of the second winding 120 is connected to the end of the first winding 118 that is not connected to the input terminal 102. The second stage circuit 170 includes a second diode 126 and a second capacitor 124. The second diode 126 has an anode connected to the other end of the second winding 120 and a cathode connected to the first output terminal 106. The second capacitor 124 is connected across the output terminals 106, 108 and has one end connected to the junction of the cathode of the second diode 126 and the first output terminal 106 and the other end connected to the second input terminal 104 and second output terminal 108.

The number of turns in the first winding 118 and second winding 120 of the magnetically coupled inductor 122 need not be the same for practicing the present invention. The number of turns is a design choice as a function of the input voltage, output voltage, and the boost MOSFET used. In a preferred embodiment, the turn ratio of first winding 118 to second winding 120 is 12:16. The output voltage can be increased by increasing the number of turns in the second winding 120 while keeping the number of turns of the first winding 118 unchanged. The RMS current flowing through the first winding 118, however, will also be increased. Consequently, the turn ratio between the first winding 118 and the second winding 120 is to be adjusted for the particular application so as to get the highest efficiency.

The second boost converter 130 is coupled between the first capacitor 112 and the second capacitor 124. The second boost converter 130 includes a second switch 134, an inductor 132, and a third diode 136 having an anode and a cathode. The second switch 134 is typically a MOSFET having a control input, a drain and a source terminal. A second control circuit 144 is coupled to the control input for providing a second control signal 148 for controlling the timing of the on and off transition of the second switch 134. The second switch 134 is alternately switched on and off as a function of the second control signal 148 for controlling current through the inductor 132. The second control circuit 144 (details not shown) preferably includes a conventional PWM controller for simple voltage mode control. As shown in the embodiment in FIG. 3, the drain terminal of second switch 134 is connected to the junction of the anode of the third diode 136 and one end of inductor 132. The source terminal of the second switch 134 is connected to the second input terminal 104. The other end of inductor 132 is connected to the junction of the first capacitor 112 and the first diode 116. Inductor 132 is connected in series with the third diode 136 between the junction of the first capacitor 112 and the first diode 116 and the first output terminal 106. The source terminal of the second switch 134 is connected to the second input terminal 104. The cathode of the third diode 136 is connected to the junction of the first output terminal 106 and the second capacitor 124.

Figure 4:
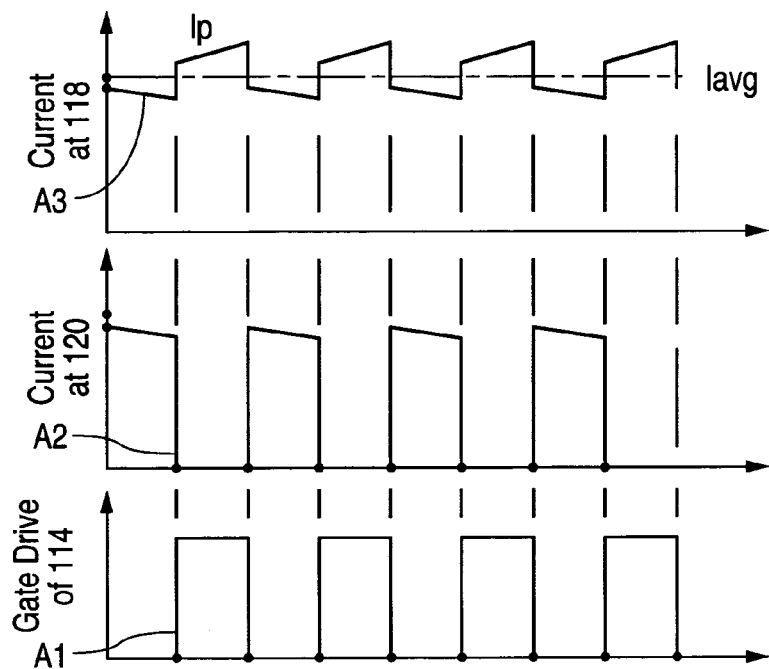
FIG. 4 is an exemplary timing diagram that illustrates the current through the first and second windings and an exemplary control signal applied to the first switch of the converter 100 in FIG. 3.

The operation of power converter 100 is explained in further detail with reference to FIGS. 3–5. In operation, when the first switch 114 is ON, current flows from the input terminal 102 through the first winding 118 and the first switch 114. Energy is stored into the first winding 118. Switching the first switch 114 OFF causes current to flow through the first winding 118, the second winding 120, and the second diode 126 to the output terminal 106. As a result, when the first switch 114 is OFF, energy is released by the first winding 118 and the second winding 120. FIG. 4 is an exemplary timing diagram that illustrates the current through the first and second windings and an exemplary control signal applied to the first switch 114 of the converter 100 in FIG. 3. In FIG. 4, waveform A1 is the first control signal 146 at the control input (gate) of switch 114. Waveform A2 is the current at the second winding 120. Waveform A3 is the current at the first winding 118. The average current $I_{avg}$ and the peak current $I_p$ for waveform A3 for the first winding 118 are also shown. For the waveforms in FIGS. 4, perfect coupling is assumed between the first and second windings of the magnetically coupled inductor 122.

When the first switch 114 is OFF, a voltage spike, $V_{ds}$, from the drain to source terminals of the first switch 114 is clamped by the first capacitor 112 through first diode 116. The energy at the first capacitor 112 is transferred to the output terminals by the second boost converter 130. For power converter 100, the second boost converter 130 may be very small since it is required to handle the energy of the voltage spike, $V_{ds}$, only.

Figure 5:
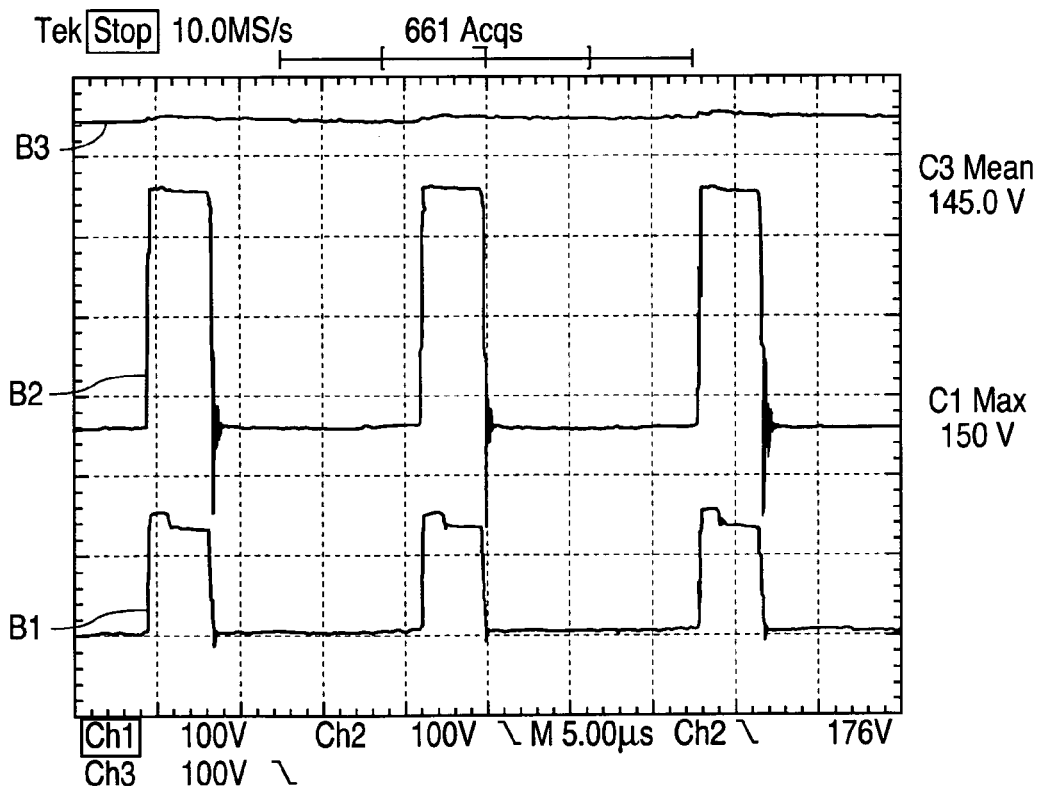
FIG. 5 is a timing diagram that illustrates voltage waveforms at various points for the boost converter in FIG. 3 operating with an exemplary input voltage of 30VDC and an output voltage of 250VDC at 2400 W.

FIG. 5 is a timing diagram that illustrates voltage waveforms at various points for the boost converter in FIG. 3 operating with an exemplary input voltage of 30VDC and an output voltage of 250VDC at 2400 W. In FIG. 5, waveform B1 is the voltage at node 115 at the junction of the first winding 118 and second winding 120 of magnetically coupled inductor 122. As shown in FIG. 5, the maximum voltage at node 115 is 160VDC. Waveform B2 is the voltage at the junction of the second diode 126 and the second winding 120, that is, at the anode of the second diode 126. As can be seen in FIG. 5, the voltage at the anode of the second diode 126 reaches the exemplary 250VDC output voltage. Waveform B3 is the voltage of the first capacitor 112. As can be seen in FIG. 5, the voltage of the first capacitor 112 averages 145 volts. The first control circuit 142 that provide the first control signal 146 for switch 114 and the second control circuit 144 that provides the second control signal 148 for second switch 134 are preferably separated.

Figure 6:
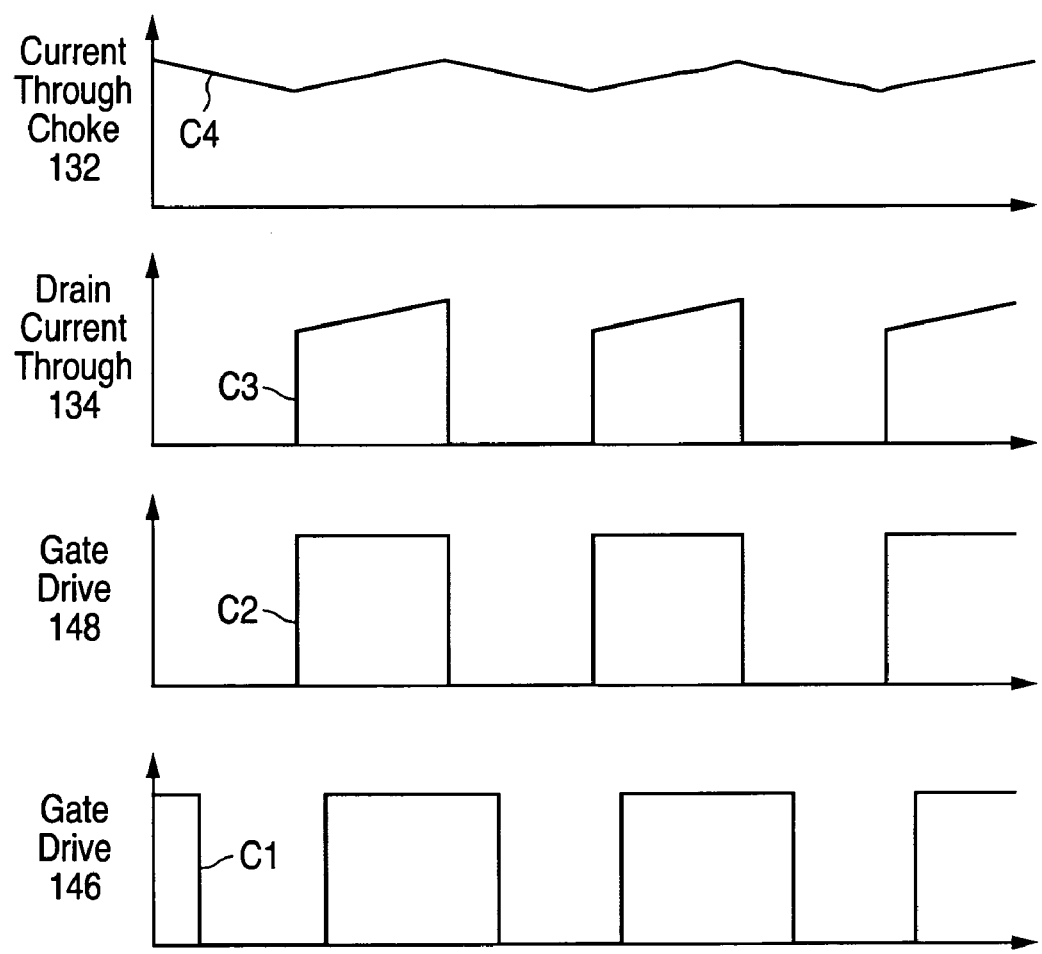
FIG. 6 is a timing diagram that illustrates voltage waveforms at various points for the boost converter in FIG. 3.

FIG. 6 is a timing diagram that illustrates voltage waveforms at various points for the boost converter in FIG. 3 including points for the small boost converter 130. In FIG. 6, waveform C1 is the gate drive control signal 146 for the first switch 114. Waveform C2 is the gate drive control signal 148 for the second switch 134. The control signals for the first switch 114 and second switch 134 are preferably synchronized so the output ripple and noise will be regular and generally lower. Alternatively, the control signals are not synchronized. Waveform C3 is the drain current through the second switch 134. Waveform C4 is the current through inductor (choke) 132.

Figure 3A:
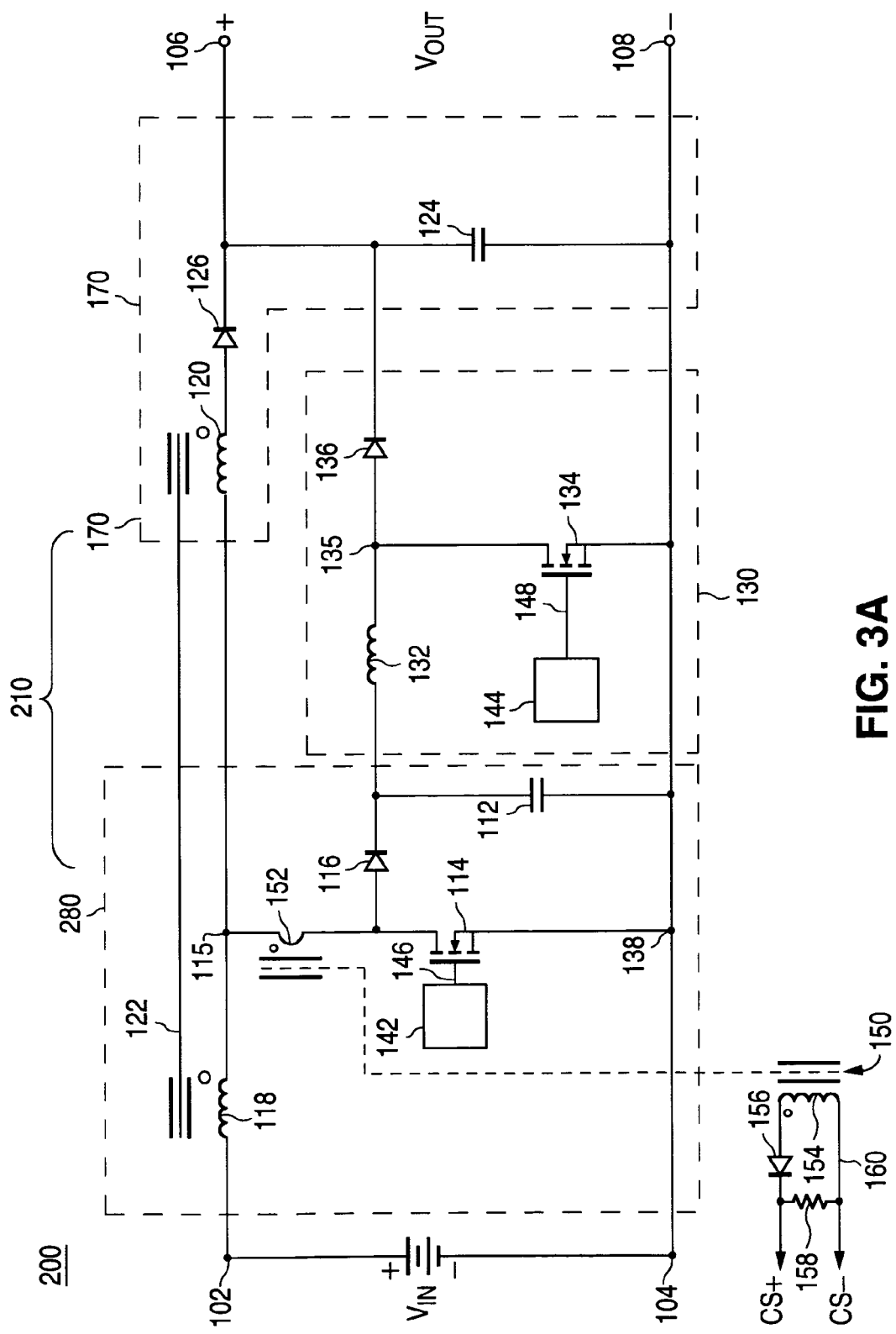
FIG. 3A is a schematic diagram of an alternate embodiment of the boost converter topology according to the present invention that include a current sense circuit.

FIG. 3A is an alternate embodiment of the power converter according to the present invention including a current sense circuit. Power converter 200 in FIG. 3A includes a two stage boost circuit 210 and a second boost converter 130. The two stage boost circuit 210 has a first stage circuit 280 and a second stage circuit 170. Power converter 200 includes a current sensor 160 having a current transformer 150 having a primary winding 152 and a secondary winding 154. The current transformer primary winding 152 is part of a first stage circuit 280. The anode of the first diode 116 is connected to the junction of the first switch 114 and the primary winding 152 of a current transformer 150. As shown in the embodiment in FIG. 3A, the drain terminal of first switch 114 is connected to the junction of the anode of the first diode and one end of the primary winding 152 of current transformer 150.

The secondary winding 154 of current transformer 150 is part of the current sensor 160 for measuring the current through the first switch 114. The secondary winding 154 is connected to a measurement resistor 158 through a fourth diode 156. The current transformer 150 and the copper trace are typically susceptible to creating a high voltage spike. The current transformer 150 in the embodiment shown in FIG. 3A is arranged in the circuit so that the first diode 116 and first capacitor 112 may be disposed much closer to first switch 114 so as to eliminate the need for a resonant snubber for reducing the voltage spike. Preferably the turns ratio of the current transformer is 1:300 or 1:60 typically depending on the current rating.

In operation, the current feedback signals (CS+ and CS−) in FIG. 3 are used to enable current mode control of the first switch 114 using control circuit 142. The control circuit 142 preferably includes a conventional PWM controller. The first switch 114 is thus preferably operated using voltage mode control for converter 100 and using current mode control for converter 200. Alternatively, the first switch 114 is operated using conventional voltage mode control. FIG. 3A is a preferred embodiment since the current mode control provides improved robustness, in most cases, as compared to simple voltage mode control. The control circuit 144 includes a conventional PWM controller with current mode control preferably provided for second switch 134. Alternatively, voltage mode control is provided for second switch 134. Thus, for the power converter according to the preferred embodmient in FIG. 3A, the first switch 114 and the second switch 134 may be operated using any combination of voltage mode control and current mode control. That is, for power converter 200, the first switch 114 and the second switch 134 may be operated with one switch operated using voltage mode control and the other using current mode control, with both switches operated using voltage mode control, or with both switches operated using current mode control, depending on the requirements of a particular application.

As described above, the present invention achieves the use of lower voltage and Rdson MOSFETs for a boost converter topology for high power applications to enable so as to reduce cost and conduction losses thereby providing increased efficiency.

Having disclosed exemplary embodiments, modifications and variations may be made to the disclosed embodiments while remaining within the scope of the invention as described by the following claims.

What is claimed is:

1. A power converter having first and second input terminals where an input voltage is provided and two output terminals where the output DC voltage is provided comprising:
   a two stage boost circuit comprising:
      a first stage circuit comprising a first switch alternately switched on and off as a function of a first control signal for controlling current through a first winding of a magnetically coupled inductor said first winding having one end connected to the first input terminal, a first diode, and a first capacitor, the first switch coupled between the junction of the other end of the first winding and the first diode and the second input terminal, and
      a second stage circuit comprising a second winding of said magnetically coupled inductor connected to the other end of said first winding and connected in series with a second diode between said first winding and the first output terminal, and a second capacitor connected across said output terminals; and
   a second boost converter coupled between said first capacitor and said second capacitor comprising a second switch, an inductor, and a third diode; said second switch is connected between the junction of said inductor and third diode and the second input terminal and is alternately switched on and off as a function of a second control signal.

2. The converter of claim 1, wherein said first control signal is provided by a first control circuit for controlling the duty cycle of said first switch.

3. The converter of claim 2, wherein said second control signal is provided by a second control circuit for controlling the duty cycle of said second switch.

4. The converter of claim 3, wherein said second control circuit has a pulse width modulation controller.

5. The converter of claim 3, wherein said first and second control signals are synchronized.

6. The converter of claim 2, wherein said first control circuit has a pulse width modulation controller.

7. The converter of claim 1, wherein said first switch is a MOSFET.

8. The converter of claim 1, wherein said second switch is a MOSFET.

9. The converter of claim 1, further comprising a current sensor for sensing the current through said first switch, said current sensor including a current transformer formed by a primary winding and a secondary winding; said current transformer primary winding is connected in series between said first winding and the junction of said first switch and said first diode.

10. The converter of claim 9, wherein said secondary winding of said current transformer is connected to a measurement resistor through a fourth diode.

11. A power converter having first and second input terminals where an input voltage is provided and two output terminals where the output DC voltage is provided comprising:
   a two stage boost circuit comprising:
      a first stage circuit comprising a first switch alternately switched on and off as a function of a first control signal for controlling current through a first winding of a magnetically coupled inductor said first winding having one end connected to the first input terminal, a first diode, and a first capacitor, and a primary winding of a current transformer connected in series between said first winding and the junction of said first switch and said first diode, said first switch coupled between the junction of said current transformer primary winding and said first diode and the second input terminal, and
      a second stage circuit comprising a second winding of said magnetically coupled inductor connected to the other end of said first winding and connected in series with a second diode between said first winding and the first output terminal, and a second capacitor connected across said output terminals;
   a second boost converter coupled between said first capacitor and said second capacitor comprising a second switch, an inductor, and a third diode; said second switch is connected between the junction of said inductor and third diode and the second input terminal and is alternately switched on and off as a function of a second control signal; and a current sensor for sensing the current through said first switch, said current sensor including a current transformer formed by said primary winding and a secondary winding, wherein said current transformer secondary winding is connected to a measurement resistor through a fourth diode.

12. The power converter of claim 11, wherein said first control signal is a function of the output voltage such that said first switch is operated using voltage mode control, and wherein said second control signal is a function of the current sensed by said current sensor such that said second switch is operated using current mode control.

13. The power converter of claim 11, wherein said first and second control signals are a function of the output voltage such that said first and second switch are both operated using voltage mode control.

14. The power converter of claim 11, wherein said first control signal is a function of the current sensed by said current sensor such that said first switch is operated using current mode control, and wherein said second control signal is a function of the output voltage such that said second switch is operated using voltage mode control.

15. The power converter of claim 11, wherein said first and second control signals are a function of the current sensed by said current sensor such that said first and second switch are both operated using current mode control.

* * * * *